US008332658B2

(12) United States Patent
Mikami et al.

(10) Patent No.: US 8,332,658 B2
(45) Date of Patent: Dec. 11, 2012

(54) COMPUTER SYSTEM, MANAGEMENT TERMINAL, STORAGE SYSTEM AND ENCRYPTION MANAGEMENT METHOD

(75) Inventors: Kyoko Mikami, Kawasaki (JP); Nobuyuki Osaki, Yokohama (JP); Yuri Hiraiwa, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 1093 days.

(21) Appl. No.: 11/968,752

(22) Filed: Jan. 3, 2008

(65) Prior Publication Data

US 2008/0263368 A1    Oct. 23, 2008

(30) Foreign Application Priority Data

Apr. 18, 2007    (JP) .................................. 2007-109709

(51) Int. Cl.
*G06F 21/00*    (2006.01)
(52) U.S. Cl. ........ 713/193; 713/189; 713/165; 713/166; 380/281; 380/284; 707/781
(58) Field of Classification Search .................. 713/189, 713/193, 165, 166; 380/281, 284; 707/781
See application file for complete search history.

(56) References Cited

U.S. PATENT DOCUMENTS

| 7,240,197 | B1 * | 7/2007 | Yamagami et al. | 713/168 |
|---|---|---|---|---|
| 7,240,220 | B2 * | 7/2007 | Osaki | 713/193 |
| 2002/0091828 | A1 * | 7/2002 | Kitamura et al. | 709/226 |
| 2005/0198453 | A1 * | 9/2005 | Osaki | 711/162 |
| 2006/0062383 | A1 * | 3/2006 | Kaneda et al. | 380/28 |
| 2006/0064604 | A1 * | 3/2006 | Osaki | 713/193 |
| 2007/0219911 | A1 * | 9/2007 | Abe | 705/51 |
| 2008/0072000 | A1 * | 3/2008 | Osaki et al. | 711/162 |
| 2010/0011226 | A1 * | 1/2010 | Inagaki et al. | 713/189 |

FOREIGN PATENT DOCUMENTS

| JP | 2005-303981 | 10/2005 |
|---|---|---|
| JP | 2006-091952 | 4/2006 |

* cited by examiner

*Primary Examiner* — Beemnet Dada
*Assistant Examiner* — Randal Moran
(74) *Attorney, Agent, or Firm* — Brundidge & Stanger, P.C.

(57) ABSTRACT

A computer system in which an encryption-decryption process performed by one encryption-decryption module can be moved to another without stopping the process for a read/write request from a host computer. The computer system has a host computer, and a storage system for storing encrypted data. The storage system provides a storage area for accepting access from the host computer. In performing a process for changing the data encrypted and stored by the destination source, the move destination encrypts the data decrypted by the move source which further encrypts and stores the data encrypted by the move destination, and after all data is stored, the move source decrypts and stores the further encrypted data.

1 Claim, 13 Drawing Sheets

FIG.2A

| STORAGE AREA IDENTIFIER (4000) | STORAGE AREA CLASS (4001) | EXTERNAL STORAGE SYSTEM IDENTIFIER (4002) | EXTERNAL STORAGE AREA IDENTIFIER (4003) | ENCRYPTED STATE (4004) | COMPUTER IDENTIFIER (4005) |
|---|---|---|---|---|---|
| VIRTUALIZED STORAGE AREA 410 | VIRTUALIZED | STORAGE SYSTEM 500 | 510 | OFF | HOST COMPUTER 200 |

| STORAGE AREA IDENTIFIER (4000) | STORAGE AREA CLASS (4001) | EXTERNAL STORAGE SYSTEM IDENTIFIER (4002) | EXTERNAL STORAGE AREA IDENTIFIER (4003) | ENCRYPTED STATE (4004) | COMPUTER IDENTIFIER (4005) |
|---|---|---|---|---|---|
| VIRTUALIZED STORAGE AREA 410 | VIRTUALIZED | STORAGE SYSTEM 500 | 510 | ON | HOST COMPUTER 200 |

| STORAGE AREA IDENTIFIER (5000) | ENCRYPTED STATE (5001) | COMPUTER IDENTIFIER (5002) |
|---|---|---|
| STORAGE AREA 510 | ON | STORAGE SYSTEM 500 |

| STORAGE AREA IDENTIFIER (5000) | ENCRYPTED STATE (5001) | COMPUTER IDENTIFIER (5002) |
|---|---|---|
| STORAGE AREA 510 | OFF | STORAGE SYSTEM 500 |

(506)

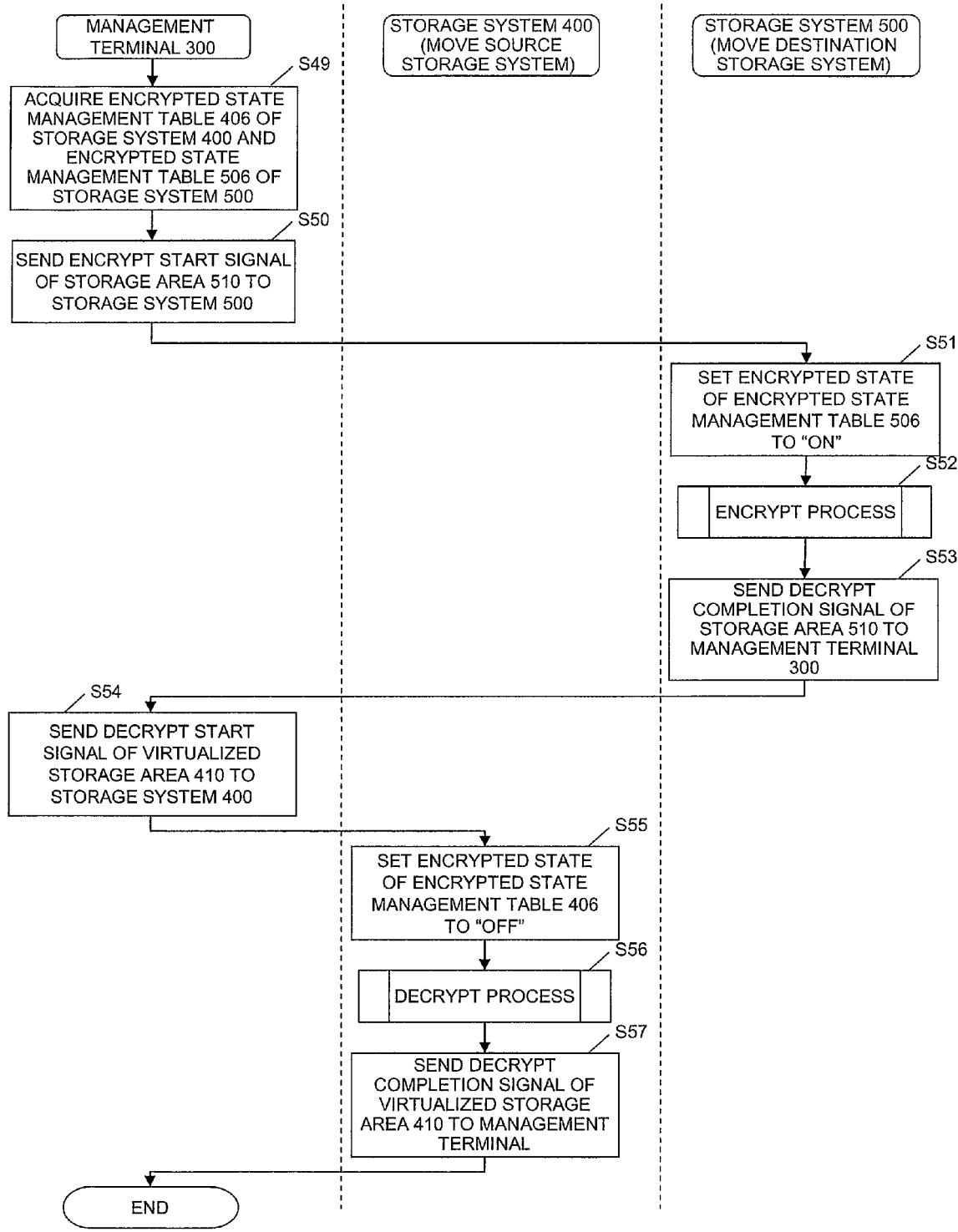

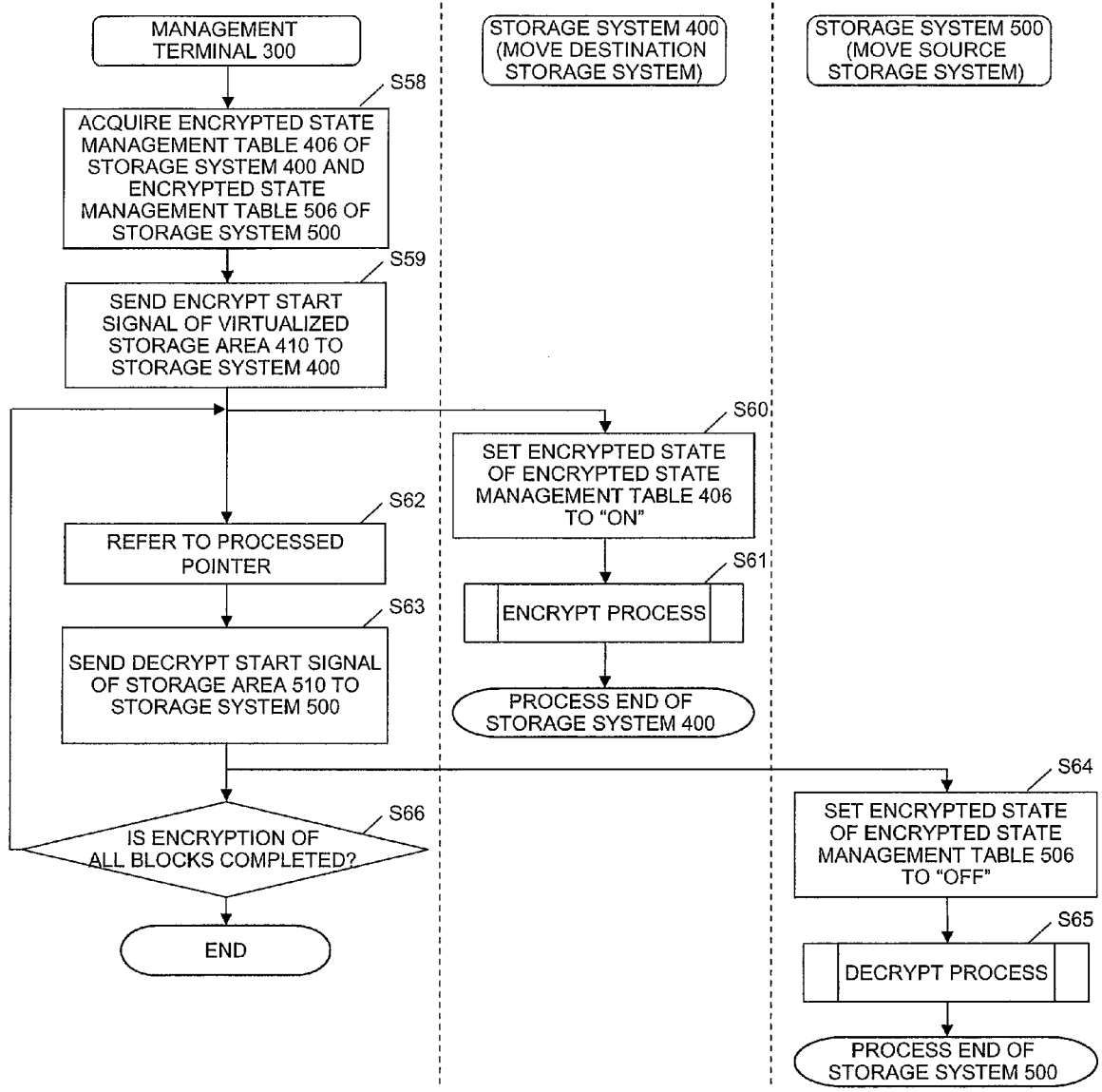

COMPUTER SYSTEM, MANAGEMENT TERMINAL, STORAGE SYSTEM AND ENCRYPTION MANAGEMENT METHOD

The present application is based on and claims priority of Japanese patent application No. 2007-109709 filed on Apr. 18, 2007, the entire contents of which are hereby incorporated by reference.

BACKGROUND OF THE INVENTION

1. Field of the Invention

The present invention relates to a computer system, a management terminal, a storage system and an encryption management method, and more particularly to an encryption-decryption function control method for an encrypted storage area in the case where a plurality of encryption-decryption means are provided on a connection path between a host computer and the storage area.

2. Description of the Related Art

In a basic system for public enterprises bearing the social infrastructure, a storage system for storing data plays an important role. These systems are required to cope with an increased data amount in the electronic infrastructure, and have high availability and security.

Therefore, a technique for enabling a storage management not dependent on the physical configuration by applying a storage virtualization technique, and shortening a system shutdown period caused by changing the system configuration has been implemented.

As a measure for enhancing the security, Japanese Patent Laid-Open Publication No. 2006-091952 discloses a technique for enabling the storage system to encrypt a data when storing data in the storage system to ensure the secrecy of the data stored in the storage system.

In a computer system applying the above-mentioned virtualization technique, a plurality of devices (called an "encryption-decryption module") for performing an encryption-decryption process for the data stored in the storage area may exist on a path where the host computer gains access to the storage area. For example, in a case where a first storage system at the upper level has a first encryption-decryption module, and a second storage system at the lower level has a second encryption-decryption module, the first encryption-decryption module and the second encryption-decryption module are provided on a connection path where the host computer gains access to the storage area provided for the second storage system. Japanese Patent Laid-Open Publication No. 2006-091952 discloses a technique for moving an encryption-decryption process for data performed by the second encryption-decryption module to the first encryption-decryption module in connecting the second storage system used singly to the first storage system. With this technique, even if there is no interoperability between the first encryption-decryption module and the second encryption-decryption module (e.g., the first encryption-decryption module and the second encryption-decryption module encrypt or decrypt the data within the storage area based on different encrypt keys and encryption-decryption algorithms), an encryption-decryption process can be performed by converting the data encrypted by the second encryption-decryption module into the data encrypted by the first encryption-decryption module.

SUMMARY OF THE INVENTION

With the technique as described in Japanese Patent Laid-Open Publication No. 2006-091952, when the process for changing an encryption-decryption module from the stopping second encryption-decryption module to the first encryption-decryption module was performed, it was required to stop a read/write request from the host computer until the process for changing was completed.

More specifically, in Japanese Patent Laid-Open Publication No. 2005-303981, a re-encrypting process where the data encrypted with a second encrypt key and encrypt algorithm is re-encrypted with a first encrypt key and encrypt algorithm is performed, and with a pointer (called a processed pointer) for identifying the boundary between the data encrypted with the second encrypt key and encrypt algorithm and the data encrypted with the second encrypt key and encrypt algorithm, if an input/output request from the host computer is received during the re-encrypting process, the encryption-decryption module functions and responds to the input/output request from the host computer by determining to which area the request belongs. Thereby, a high availability required for the storage system was realized. However, in the case where the virtualization technique is applied to the storage system, and the encryption-decryption module using the first encrypt key and encrypt algorithm and the encryption-decryption module using the second encrypt key and encrypt algorithm are provided on different storage systems, a processed pointer is required within each storage system to move the encryption-decryption process performed by the second encryption-decryption module to the first encryption-decryption module, whereby a new interface is required between the storage systems. Therefore, to continually use the existent storage systems without alteration, it is required to perform a move process for the encryption-decryption module in a state where there is no read/write request from the host computer, resulting in the lower availability of the storage system or computer system.

It is an object of the invention to provide a computer system, a management terminal, a storage system and an encryption management method in which an encryption-decryption process performed by one encryption-decryption module can be moved to the other encryption-decryption module without stopping the process for a read/write request from the host computer without changing the interface between two storage systems.

According to the present invention, there is provided a computer system having one or more host computers, and a plurality of storage systems each having one or more storage areas for storing data that the host computer reads or writes, wherein two of the plurality of storage systems are a first storage system and a second storage system that store the encrypted data in respective storage areas, and one storage system provides a storage area that the other storage system connected has as the area for accepting access from the host computer as the storage area of its own, in performing a process for changing in which the data encrypted and stored in the storage area of the first storage system by the first storage system is encrypted and stored in the storage area of the first storage system by the second storage system, the data to be moved is divided into one or more blocks, for each block, the second storage system encrypts successively the data decrypted by the first storage system, and the first storage system further encrypts and stores successively the data encrypted by the second storage system in the storage area of the first storage system, and after all the data in one block is further encrypted and stored in the storage area of the first storage system, the first storage system successively decrypts all the data in one block further encrypted and stores the data encrypted by the second storage system in the storage area of the first storage system.

With the invention, the process for changing an encryption-decryption module from the second encryption-decryption module to the first encryption-decryption module can be performed without changing the interface between the first storage system and the second storage system, and without stopping the process for read/write request from the host computer.

BRIEF DESCRIPTION OF THE DRAWINGS

FIG. 2 is a block diagram showing the organization of an encrypted state management table in a storage system 400 of the embodiment 1;

FIG. 3 is a block diagram showing the organization of an encrypted state management table in a storage system 500 of the embodiment 1;

FIG. 13 is an explanatory diagram for explaining a process for changing the encryption-decryption process from the encryption-decryption module 405 to the encryption-decryption module 505 in the embodiment 1; and FIG. 14 is an explanatory diagram for explaining a process for changing the encryption-decryption process from the encryption-decryption module 505 to the encryption-decryption module 405 in an embodiment 2.

DETAILED DESCRIPTION OF THE PREFERRED EMBODIMENTS

The best mode for carrying out the present invention will be described below.

The embodiments of a computer system, a management terminal, a storage system and an encryption management method of the present invention will be described below with reference to the drawings.

Embodiment 1

Figure 1:
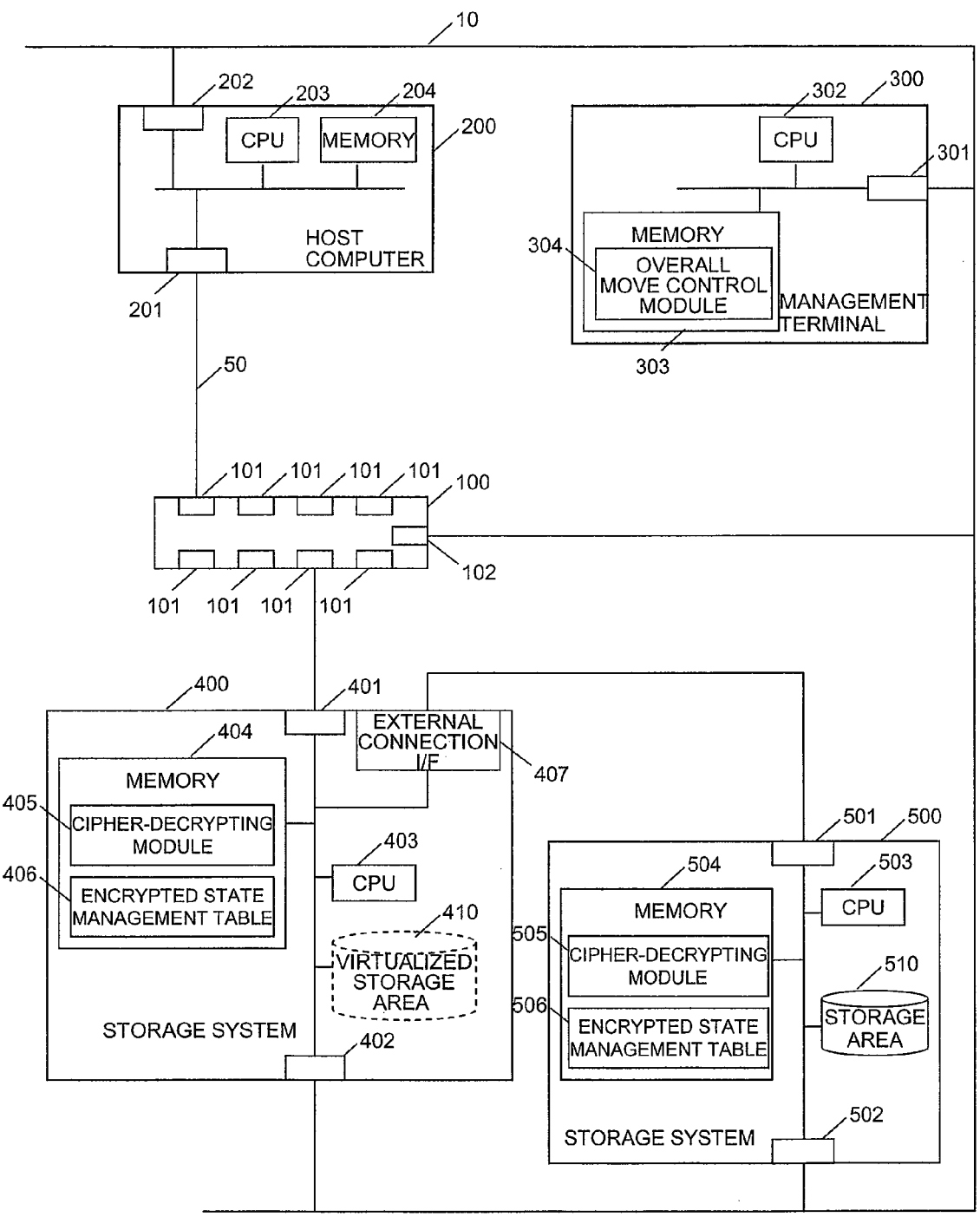
FIG. 1 is a block diagram showing the configuration of a computer system according to an embodiment 1.

An embodiment 1 will be described below. FIG. 1 is a diagram showing a computer system according to the first embodiment of the present invention. The computer system comprises a fibre channel switch 100, a host computer 200, a management terminal 300 and the storage systems 400, 500. The host computer 200 and the storage system 400 are connected via the fibre channel switch 100. Further, the storage system 400 and the storage system 500 are connected to each other via a fibre channel network 50. Also, the host computer 200, the management terminal 300 and the storage systems 400, 500 are interconnected via a network 10.

The fibre channel switch 100 comprises a fibre channel interface 101 and a network interface 102. The host computer 200 and the storage system 400 are connected via the fibre channel interface 101. Also, the fibre channel switch 100 is connected to the network 10 via the network interface 102.

The host computer 200 comprises a CPU 203, a memory 204, a fibre channel interface 201 and a network interface 202. The host computer 200 is connected to the fibre channel switch 100 via the fibre channel interface 201. The host computer 200 is connected to the network 10 via the network interface 202. The host computer 200 executes an application program (not shown) stored in the memory 204. The application program is executed by the CPU 203 to send a data read/write request to the storage system 400.

The management terminal 300 comprises a CPU 302, a memory 303, and a network interface 301. The memory 303 is provided with an overall move control module 304.

The management terminal 300 manages the storage systems 400 and 500. The management terminal 300 is connected to the network 10 via the network interface 301.

The overall move control module 304 is the module that controls a process for changing an encryption-decryption process performed by an encryption-decryption module 505 to be performed in an encryption-decryption module 405. Similarly, it also controls a process for changing an encryption-decryption process performed by the encryption-decryption module 405 to be performed in the encryption-decryption module 505. The details of each process for changing will be described with reference to FIGS. 6 and 12.

The storage system 400 comprises a CPU 403, a memory 404, a virtualized storage area 410, an external connection interface (I/F) 407, a fibre channel interface 401 and a network interface 402. The memory 404 is provided with a read/write request processing module (not shown) for processing a read/write request from the host computer 200, a storage area management module (not shown) for managing the storage area, an encryption-decryption module 405 and an encrypted state management table 406.

The storage system 400 comprises an external connection I/F 407 that is the interface for connecting an external connection to the storage system 400. The host computer 200 has access to the storage area provided for the storage system 500 connected to the external connection I/F 407, like the storage area provided for the storage system 400.

The storage system 400 is connected to the fibre channel switch 100 via the fibre channel interface 401. The storage system 400 is connected to the network 10 via the network interface 402. The storage system 400 is connected to the storage system 500 via the external connection I/F 407.

The encryption-decryption module 405 is the module for encrypting and decrypting the data stored in the storage area as described in Japanese Patent Laid-Open Publication No. 2006-091952.

The encrypted state management table 406 manages the encrypted state of the storage area provided for the storage system 400. The details of the encrypted state management table 406 will be described below with reference to FIG. 2.

The storage system 500 has fundamentally the same configuration as the storage system 400, except that the storage system 500 is connected to the external connection interface 407 of the storage system 400 via the fibre channel interface 501.

FIG. 2A is a view showing one example of the organization of the encrypted state management table 406 in the embodiment 1. The encrypted state management table 406 includes a storage area identifier 4000, a storage area class 4001, an external storage system identifier 4002, an external storage area identifier 4003, an encrypted state 4004 and a computer identifier 4005.

The storage area identifier 4000 registers an identifier for identifying the storage area registered in the storage system 400.

The storage area class 4001 registers "virtualized" or "real". If the "virtualized" is registered in the storage area class 4001, the storage area identified by the identifier registered in the storage area identifier 4000 of the entry concerned is a virtualized storage area (called a "virtualized storage area"). Therefore, if there is a data write request for the virtualized storage area, the data is stored in the storage area (called a "real storage area") registered as entity of the virtualized storage area. On the other hand, if the "real" is registered in the storage area class 4001, the storage area identified by the identifier registered in the storage area identifier 4000 of the entry concerned is a real storage area. Therefore, if there is a data write request for the real storage area, the data is stored in the storage area concerned (real storage area).

The external storage system identifier 4002 and the external storage area identifier 4003 are registered when the storage area class 4001 is "virtualized". The external storage system identifier 4002 and the external storage area identifier 4003 register the identifiers for identifying the storage system having the storage area that is entity of the virtualized storage area and the storage area.

The encrypted state 4004 registers "ON" or "OFF". When the "ON" is registered in the encrypted state 4004, the data stored in the storage area identified by the identifier registered in the storage area identifier 4000 of the entry concerned is encrypted by the encryption-decryption module 405, and when the data is read, the data is decrypted by the encryption-decryption module 405. When the "OFF" is registered in the encrypted state, the encryption-decryption module 405 does not perform the encryption-decryption process for the data stored in the storage area identified by the identifier registered in the storage area identifier 4000 of the entry concerned.

The computer identifier 4005 registers the identifier of the host computer capable of reading and writing data in the storage area identified by the identifier registered in the storage area identifier 4000 of the entry concerned.

FIG. 2A shows an example of the encrypted state management table 406 in the case where the encryption-decryption process for the data stored in the virtualized storage area 410 is not performed by the encryption-decryption module 405. On the other hand, FIG. 2B shows an example of the encrypted state management table 406 in the case where the encryption-decryption process for the data stored in the virtualized storage area 410 is performed by the encryption-decryption module 405.

FIG. 3A is a view showing one example of the organization of an encrypted state management table 506 in the embodiment 1. The encrypted state management table 506 includes a storage area identifier 5000, an encrypted state 5001 and a computer identifier 5002.

The roles of the storage area identifier 5000, the encrypted state 5001 and the computer identifier 5002 are identical to those of the storage area identifier 4000, the encrypted state 4004 and the computer identifier 4005 in the encrypted state management table 406.

FIG. 3A shows an example of the encrypted state management table 506 in the case where the encryption-decryption process for the data stored in the storage area 510 is not performed by the encryption-decryption module 505, and FIG. 3B shows an example of the encrypted state management table 506 in the case where the encryption-decryption process for the data stored in the storage area 510 is performed by the encryption-decryption module 505.

Herein, an instance where the encrypted state management tables 406 and 506 are registered as shown in FIGS. 2A and 3A will be described below. The virtualized storage area 410 provided for the storage system 400 is the virtualized storage area, and the storage area of its entity is the storage area 510 provided for the storage system 500. Also, it is the host computer 200 that can send a read/write request for the data to the virtualized storage area 410. Therefore, if the host computer 200 issues a write request to the virtualized storage area 410, the data is written into the storage area 510, or if the host computer 200 issues a read request, the data is read from the storage area 510. That is, the host computer 200 can read and write the data from and into the storage area 510 provided for the storage system 500, like the storage area provided for the storage system 400. Also, when the data is written into the storage area 510, the data is encrypted by the encryption-decryption module 505 of the storage system 500, and then written. When the data is read from the storage area 510, the data is decrypted by the encryption-decryption module 505 of the storage system 500 and then read.

On the other hand, in the case where the encrypted state management tables 406 and 506 are registered as shown in FIGS. 2B and 3B, the data written into the storage area 510 that is the entity of the virtualized storage area 410 is encrypted by the encryption-decryption module 405 and then written. Also, when the data is read from the storage area 510, the data is decrypted by the encryption-decryption module 405 of the storage area 400 and then read.

Figure 4:
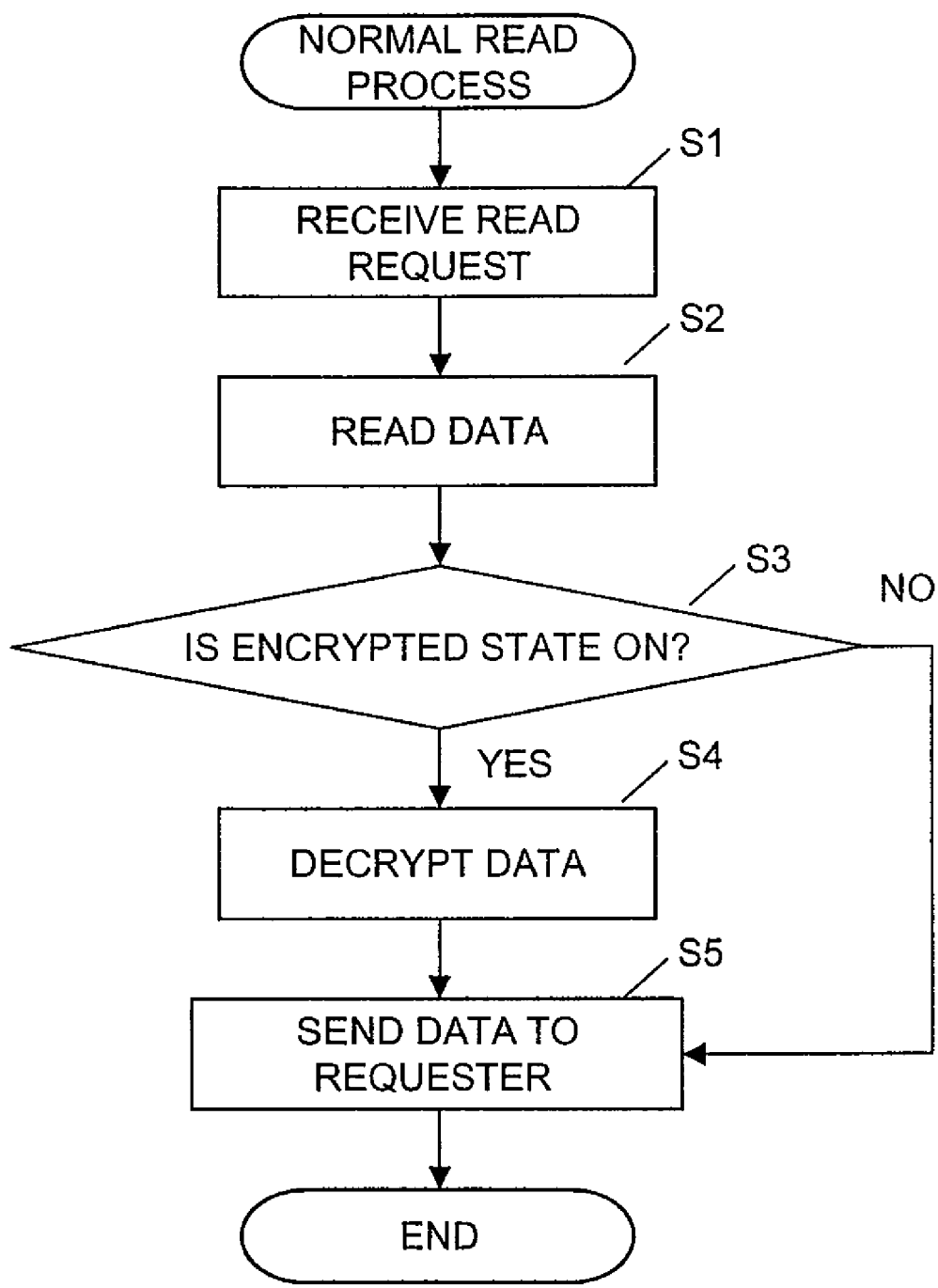
FIG. 4 is a flowchart for explaining a process when the storage system 400 of the embodiment 1 receives a read request.

FIG. 4 is a flowchart for explaining a process (normal read process) when the storage system 400 receives a read request for the storage area identified by the identifier registered in the storage area identifier 4000 of the encrypted state management table 406 from the host computer 200 identified by the identifier registered in the computer identifier 4005 of the entry concerned in the embodiment 1. The same process is also performed when the storage system 500 receives a read request.

If the storage system 400 receives a read request (S1), the data is read from the storage area (S2). A determination is made whether or not the encrypted state 4004 is "ON" by referring to the encrypted state management table 406, and acquiring the encrypted state 4004 of the entry in which the identifier of the storage area concerned is registered in the storage area identifier 4000 (S3). If the encrypted state 4004 is "ON", the read data is decrypted (S4), and sent to the requester (S5). If the encrypted state 4004 is "OFF", the read data is not decrypted and is directly sent to the requester (S5). And the normal read process is ended.

Figure 5:
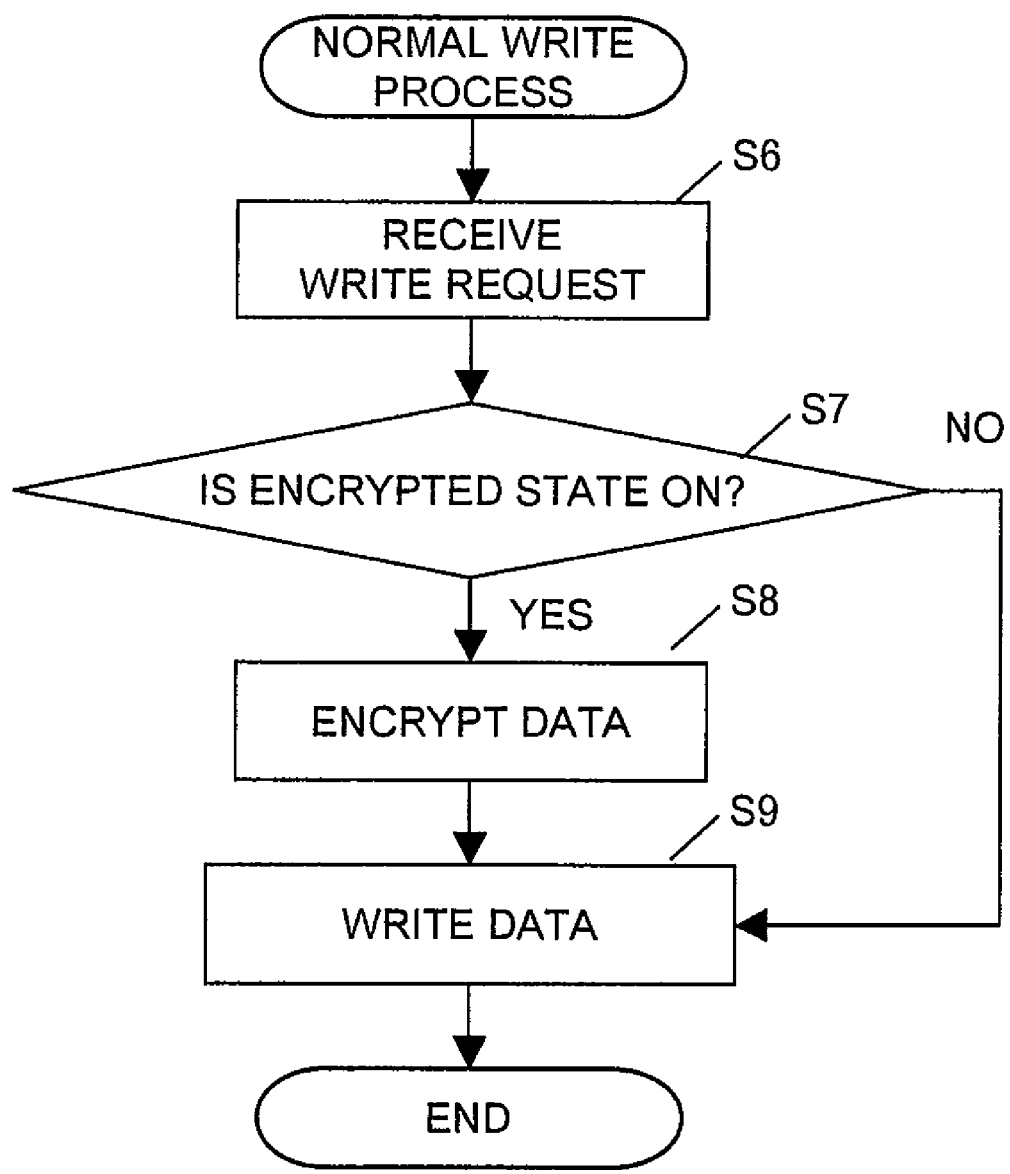
FIG. 5 is a flowchart for explaining a process when the storage system 400 of the embodiment 1 receives a write request.

FIG. 5 is a flowchart for explaining a process (normal write process) when the storage system 400 receives a write request for the storage area identified by the identifier registered in the storage area identifier 4000 of the encrypted state management table 406 from the host computer 200 identified by the identifier registered in the computer identifier 4005 of the entry concerned in the embodiment 1. The same process is also performed when the storage system 500 receives a write request.

If the storage system 400 receives a write request (S6), a determination is made whether or not the encrypted state 4004 is "ON" by referring to the encrypted state management table 406, and acquiring the encrypted state 4004 of the entry in which the identifier of the storage area to write the data is registered in the storage area identifier 4000 (S7). If the encrypted state 4004 is "ON", the received data is encrypted (S8), and written into the storage area (S9). If the encrypted state 4004 is "OFF", the received data is not encrypted, and is directly written into the storage area (S9). And the normal write process is ended.

Figure 6:
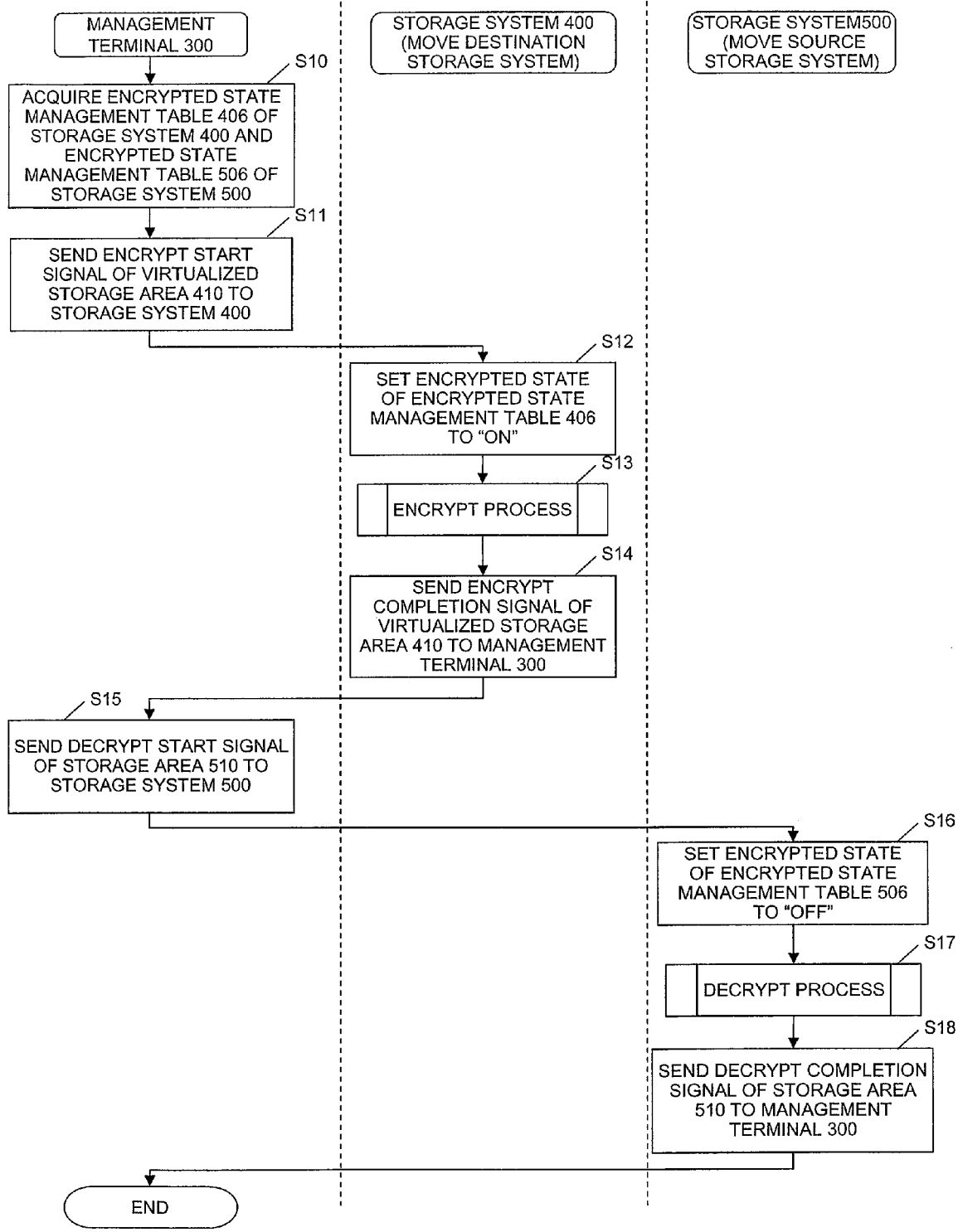
FIG. 6 is an explanatory diagram for explaining a process for changing an encryption-decryption process from the encryption-decryption module 505 to the encryption-decryption module 405 in the embodiment 1.

FIG. 6 is a flowchart for explaining a process for converting the data of the storage area 510 encrypted by the encryption-decryption module 505 of the storage system (move source) 500 to the data encrypted by the encryption-decryption module 405 of the storage system (move destination) 400 and changing the encryption-decryption process performed by the encryption-decryption module 505 to be performed by the encryption-decryption module 405 in the embodiment 1. That is, this is a process for changing the encryption-decryption process performed by the encryption-decryption module 505 of the lower-level device to be performed by the encryption-decryption module 405 of the upper-level device.

Before starting the process for changing, the administrator (user who can use the management terminal 300) designates the storage area of move object, the storage system having the storage area concerned, the move destination encryption-decryption module, and the storage system having the encryption-decryption module concerned. That is, in the process for changing as shown in the flowchart of FIG. 6, the move object is the storage area 510 (or virtualized storage area 410), the storage system having the move object is the storage system 500, the move destination encryption-decryption module is the encryption-decryption module 405 and the storage system having the move destination encryption-decryption module is the storage system 400.

First of all, the overall move control module 304 acquires the encrypted state management tables 406 and 506 for the storage systems 400 and 500 (S10), and obtains the correspondence between the virtualized storage area and the real storage area. Then, an encrypt start signal of the virtualized storage area 410 is sent to the storage system 400 (S11).

If the storage system 400 receives the encrypt start signal, the encrypted state 4004 of the entry in which the storage area identifier 4000 of the encrypted state management table 406 is the virtualized storage area 410 is set to "ON" (S12). Then, the encrypt process of the virtualized storage area 410 is performed (S13). The details of the encrypt process will be described later with reference to FIG. 7. After the encrypt process of the virtualized storage area 410 is completed, the storage system 400 sends an encrypt completion signal to the management terminal 300 (S14).

If the management terminal 300 receives the encrypt completion signal, the overall move control module 304 sends a decrypt start signal of the storage area 510 that is the real storage area corresponding to the virtualized storage area 410 to the storage area 500, based on the encrypted state management tables 406 and 506 acquired at S10 (S15).

If the storage system 500 receives the decrypt start signal, the encrypted state 5001 of the entry in which the storage area identifier 5000 of the encrypted state management table 506 is the storage area 510 is set to "OFF" (S16). Then, the decrypt process of the storage area 510 is performed (S17). The details of the decrypt process will be described later with reference to FIG. 8. After the decrypt process of the storage area 510 is completed, the storage system 500 sends a decrypt completion signal to the management terminal 300 (S18), and the process is ended.

Figure 7:
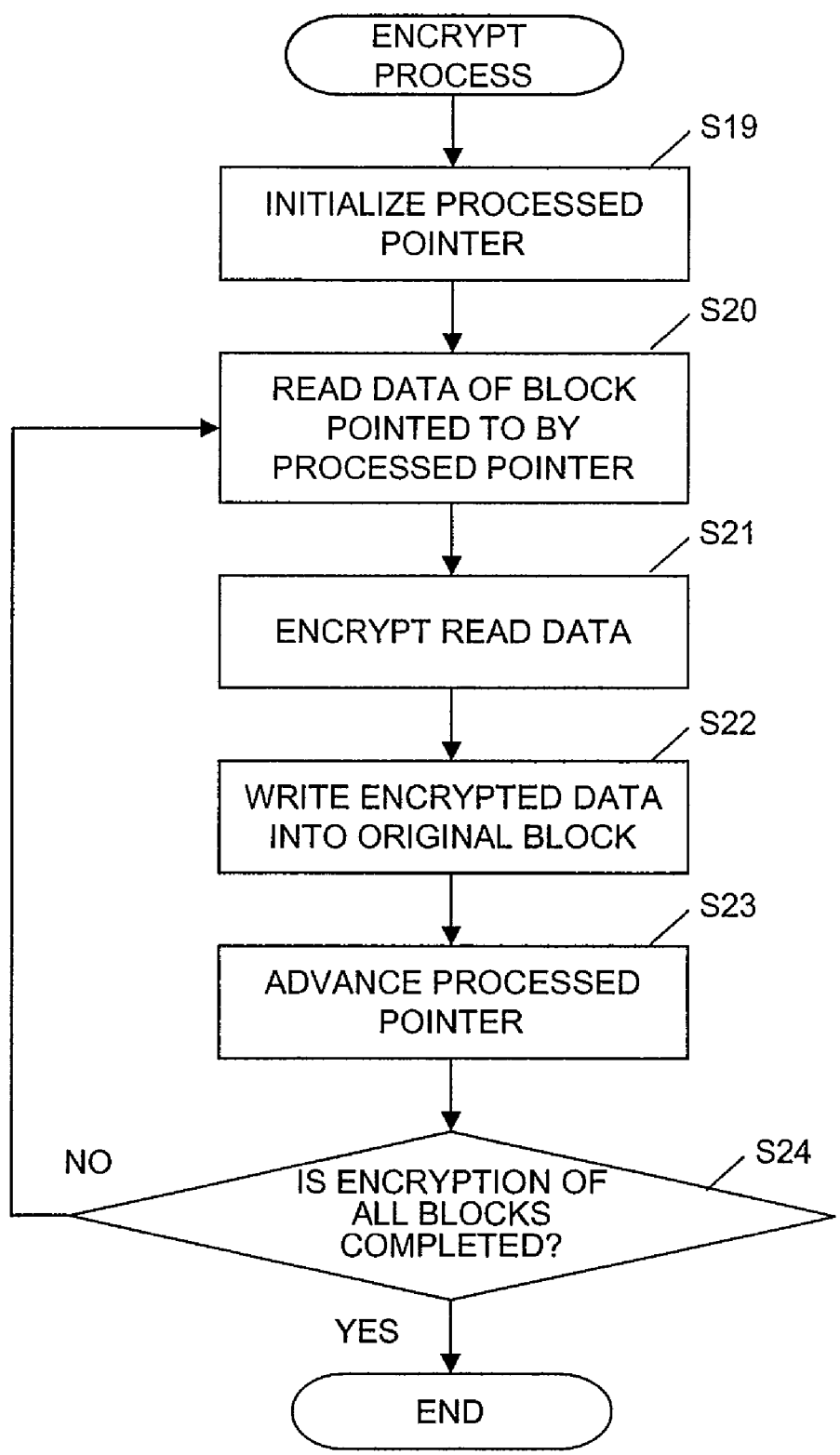
FIG. 7 is a flowchart for explaining an encrypt process in the embodiment 1.

FIG. 7 is a flowchart for explaining the encrypt process as indicated at S13 in FIG. 6 in the embodiment 1. First of all, the processed pointer is initialized to the leading block for which the encrypt process is performed (S19). Then, the data (encrypted in the move source) of the block as pointed to by the processed pointer is read (S20), the read data (decrypted in the move source) is encrypted in the move destination (S21), and the data encrypted in the move destination is written into the original block (S22). At this time, the data is further encrypted in the move source. The processed pointer is advanced to the next block (S23), and a determination is made whether or not the encryption of all the blocks in the move destination is completed (S24). If the encryption of all the blocks is not completed, the operation returns to S20. If the encryption of all the blocks is completed, the encrypt process is ended. Though the data of all the blocks has been encrypted in the move source, the data is encrypted in the move destination after being decrypted in the move source, and further encrypted in the move source.

Figure 8:
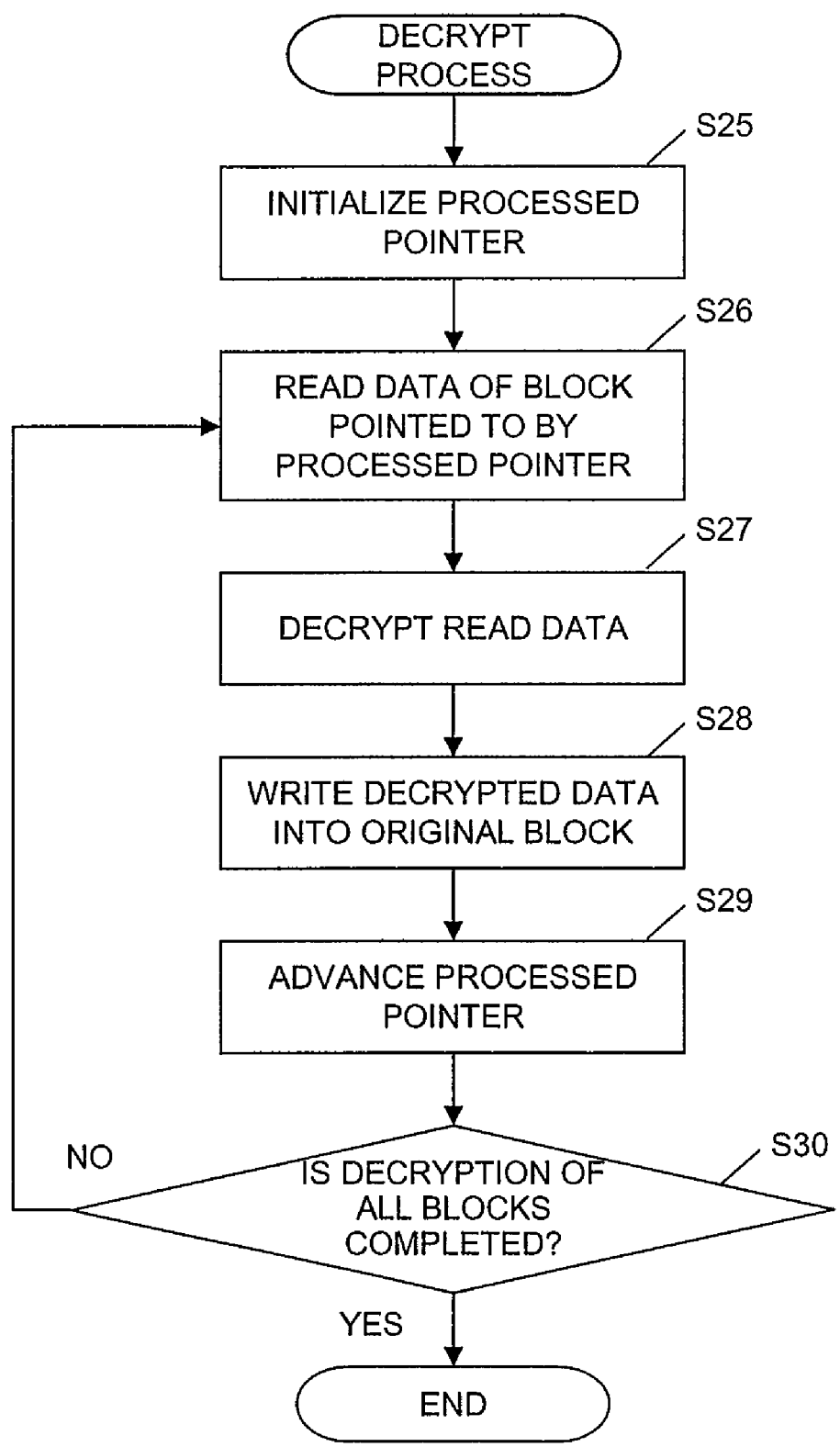
FIG. 8 is a flowchart for explaining a decrypt process in the embodiment 1.

FIG. 8 is a flowchart for explaining the decrypt process as indicated at S17 in FIG. 6 in the embodiment 1. First of all, the processed pointer is initialized to the leading block of the storage area for which the decrypt process is performed (S25). Then, the data of the block as pointed to by the processed pointer is read (S26), the read data is decrypted in the move source (S21), and the decrypted data is written into the original block (S28). The processed pointer is advanced to the next block (S29), and a determination is made whether or not the decryption of all the blocks is completed (S30). If the decryption of all the blocks is not completed, the operation returns to S26. If the decryption of all the blocks is completed, the process is ended. Though data of all the blocks has been encrypted in the move destination, and further encrypted in the move source, data is encrypted in the move destination because it is decrypted in the move source.

Figure 9:
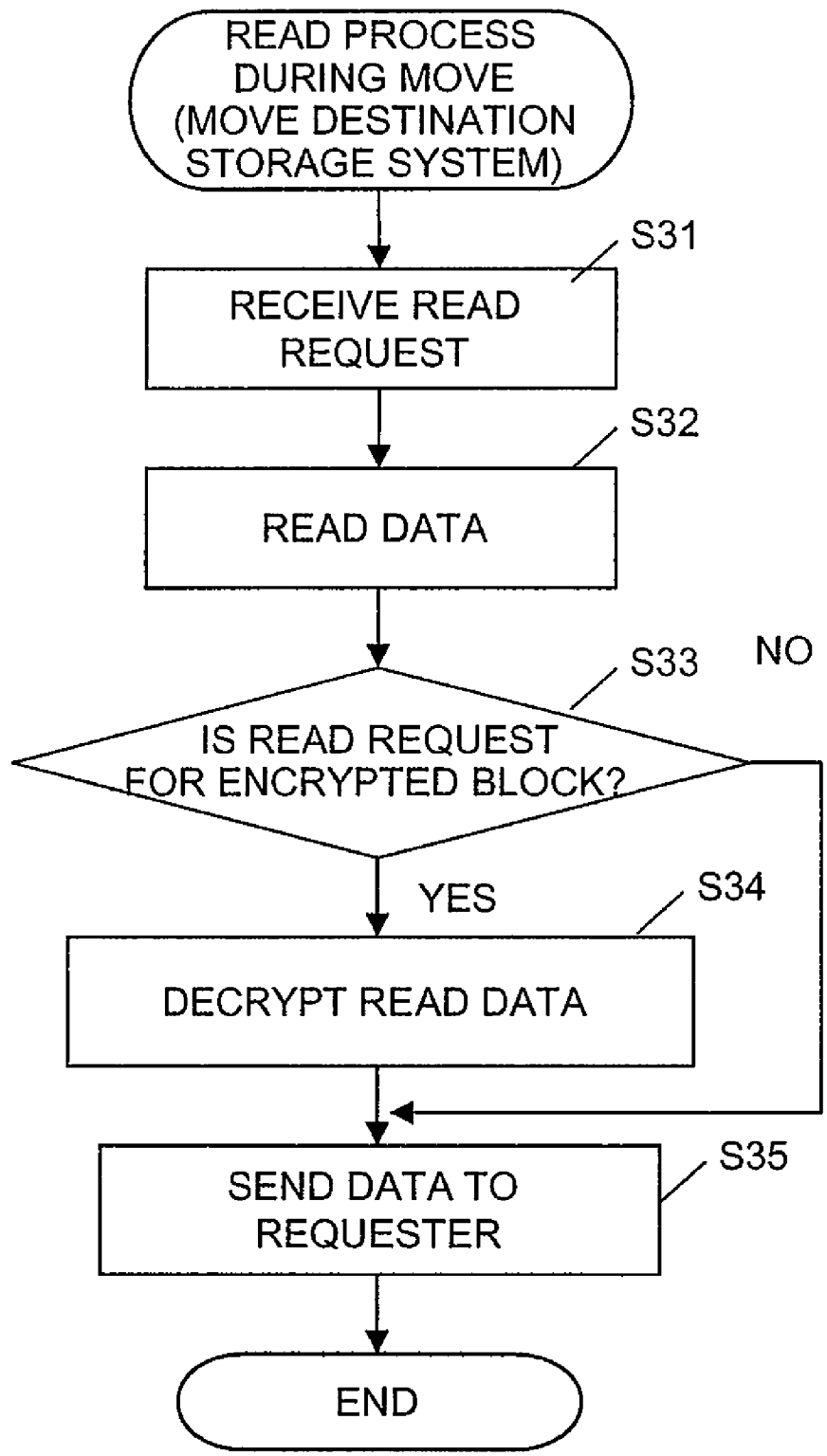
FIG. 9 is a flowchart for explaining a process when the storage system 400 receives a read request during the process for changing in the embodiment 1.

FIG. 9 is a flowchart for explaining a process for receiving a read request for the virtualized storage area 410 while the storage system (move destination) 400 receives an encrypt start signal from the management terminal 300, sets the encrypted state 4004 of the encrypted state management table 406 to "ON" (S12) and sends an encrypt completion signal to the management terminal 300 (S14) in the embodiment 1.

If the storage system 400 receives a read request for the virtualized storage area 210 (S31), it reads data from the storage area 510 corresponding to the virtualized storage area 410 (S32), and determines whether or not the read request is for the encrypted block (S33). If the read request is for the encrypted block, the read data (decrypted in the move source) is decrypted in the move destination (S34), and sent to the requester (S35). If the read request is for the unencrypted block, the read data (decrypted in the move source) is not decrypted, and is directly sent to the requester (S35). And the read process during move (move source storage system) is ended. That is, the move source encryption-decryption module 505 decrypts all the read data. On the other hand, the move destination encryption-decryption module 405 decrypts or does not decrypt the read data, depending on whether the data is encrypted or unencrypted.

Figure 10:
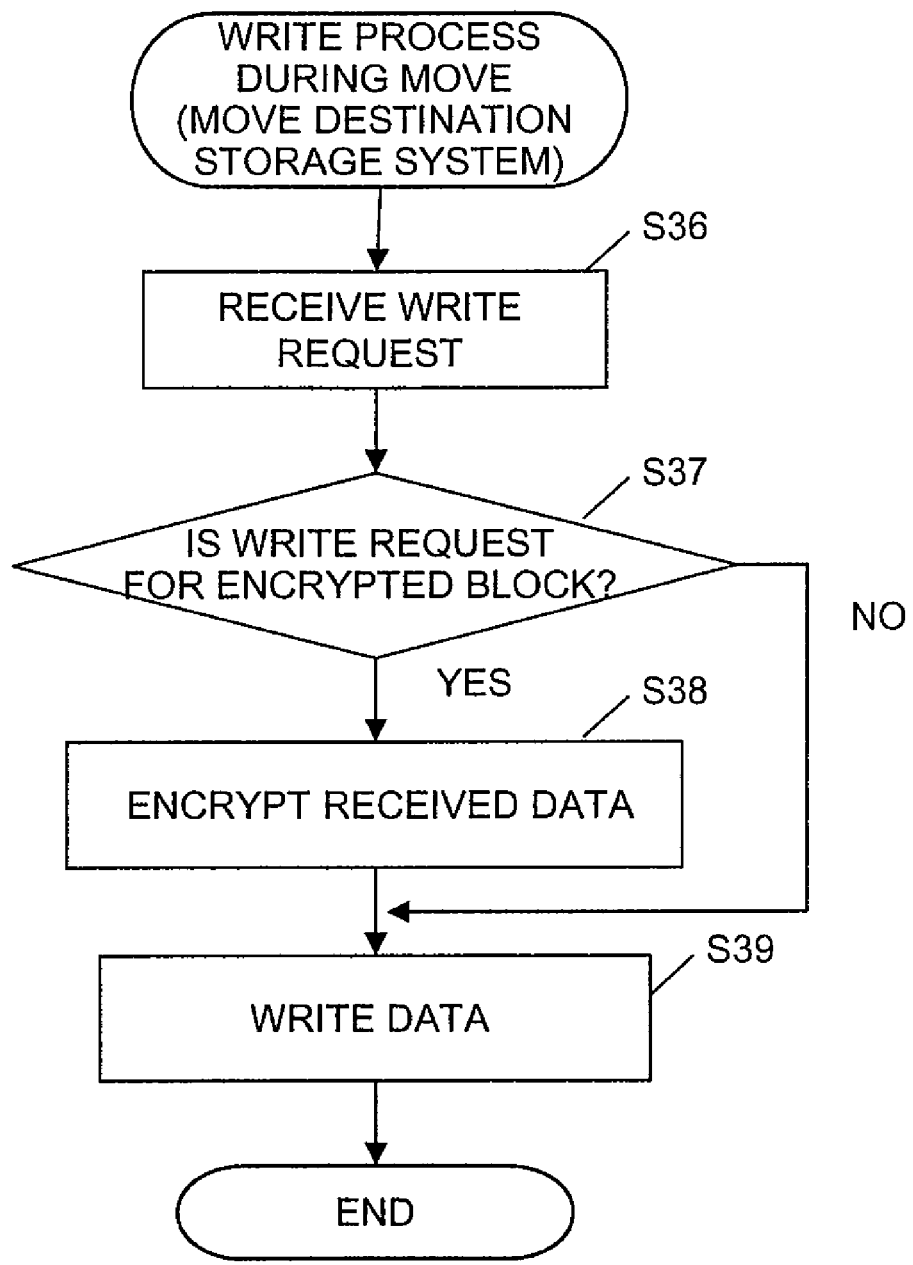
FIG. 10 is a flowchart for explaining a process when the storage system 400 receives a write request during the process for changing in the embodiment 1.

FIG. 10 is a flowchart for explaining a process for receiving a write request for the virtualized storage area 410 while the storage system (move destination) 400 receives an encrypt start signal from the management terminal 300, sets the encrypted state 4004 of the encrypted state management table 406 to "ON" (S12) and sends an encrypt completion signal to the management terminal 300 (S14) in the embodiment 1.

If the storage system 400 receives a write request for the virtualized storage area 410 (S36), it determines whether or not the write request is for the encrypted block (S37). If the write request is for the encrypted block, the received data is encrypted (S38), and written into the storage area 510 corresponding to the virtualized storage area 410 (S39). At this time, the data is further encrypted in the move source. If the write request is for the unencrypted block, the received data is not encrypted, and is directly written into the storage area 510 corresponding to the virtualized storage area 410 (S39). At this time, the data is encrypted in the move source. And the write process during move (move source storage system) is ended. That is, the move destination encryption-decryption module 405 encrypts or does not encrypt the write data depending on whether the data is encrypted or unencrypted. On the other hand, the move source encryption-decryption module 505 encrypts all the write data.

Figure 11:
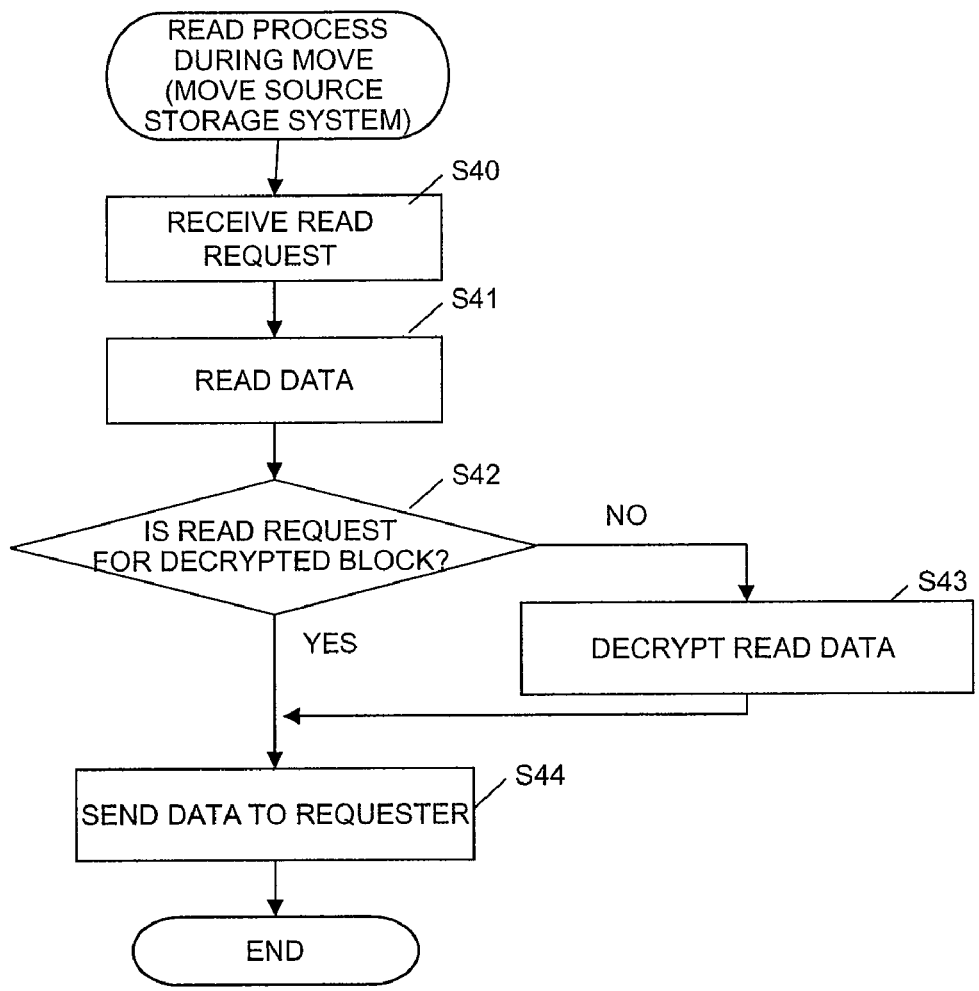
FIG. 11 is a flowchart for explaining a process when the storage system 500 receives a read request during the process for changing in the embodiment 1.

FIG. 11 is a flowchart for explaining a process for receiving a read request for the storage area 510 while the storage system (move source) 500 receives a decrypt start signal from the management terminal 300, sets the encrypted state 5001 of the encrypted state management table 506 to "OFF" (S16) and sends a decrypt completion signal to the management terminal 300 (S18) in the embodiment 1.

If the storage system 500 receives a read request for the storage area 510 (S40), it reads the data from the storage area 510 (S41) and determines whether or not the read request is for the decrypted block (S42). If the read request is for the decrypted block, the read data is directly sent to the requester (S44). At this time, the move destination encryption-decryption module 405 decrypts all the data. If the read request is for the undecrypted block, the read data is decrypted (S43) and sent to the requester (S44). At this time, the move destination encryption-decryption module 405 decrypts all the data. And the write process during move (move destination storage system) is ended. That is, the move destination encryption-decryption module 405 decrypts all the read data. On the other hand, the move source encryption-decryption module 505 does not decrypt or decrypts the read data depending on whether the data is decrypted or not.

Figure 12:
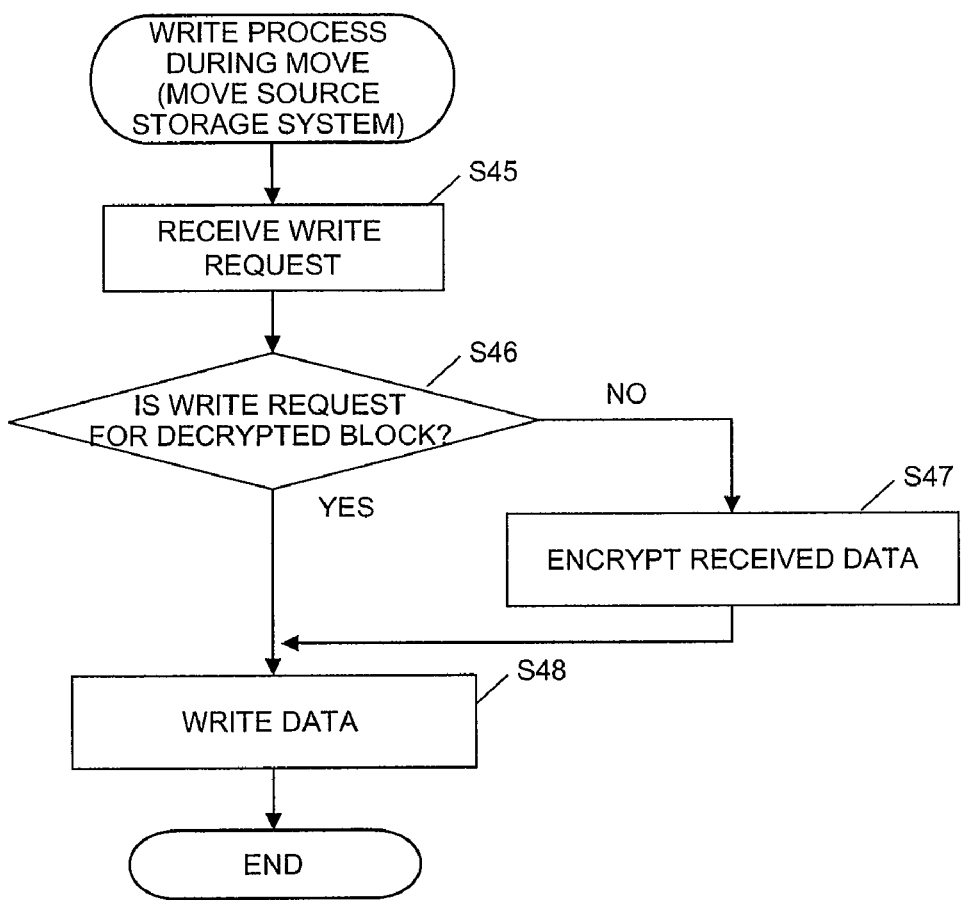
FIG. 12 is a flowchart for explaining a process when the storage system 500 receives a write request during the process for changing in the embodiment 1.

FIG. 12 is a flowchart for explaining a process for receiving a write request for the storage area 510 while the storage system (move source) 500 receives a decrypt start signal from the management terminal 300, sets the encrypted state 5001 of the encrypted state management table 506 to "OFF" (S16) and sends an encrypt completion signal to the management terminal 300 (S18) in the embodiment 1.

If the storage system 500 receives a write request for the storage area 510 (S45), it determines whether or not the write request is for the decrypted block (S46). If the write request is for the decrypted block, the received data is directly written into the storage area 510 (S48). The write data is already encrypted by the move destination encryption-decryption module 405. If the write request is for the undecrypted block, the received data is encrypted (S47) and written into the storage area 510 (S48). The write data is already encrypted by the move destination encryption-decryption module 405. And the write process during move (move destination storage system) is ended. That is, the move destination encryption-decryption module 405 encrypts all the write data. On the other hand, the move source encryption-decryption module 505 does not encrypt or encrypts the write data depending on whether the data is decrypted or not.

The process when the storage system 400 or the storage system 500 receives a read/write request at any other timing than the above is the same as the process for the read request or write request at the normal time as shown in FIGS. 4 and 5.

FIG. 13 is a flowchart for explaining a process for converting data of the storage area 510 encrypted by the encryption-decryption module 405 of the storage system (move source) 400 to data encrypted by the encryption-decryption module 505 of the storage system (move destination) 500 and changing the encryption-decryption process performed by the encryption-decryption module 405 to be performed by the encryption-decryption module 505 in the embodiment 1. That is, the encryption-decryption process performed by the encryption-decryption module 405 of the upper-level device is changed to be performed by the encryption-decryption module 505 of the lower-level device.

Before starting the process for changing, the administrator (user who can use the management terminal 300) designates the storage area of move object, the storage system having the storage area concerned, the move destination encryption-decryption module, and the storage system having the encryption-decryption module concerned.

First of all, the management terminal 300 acquires the encrypted state management tables 406 and 506 for the storage systems 400 and 500 (S49), and obtains the correspondence between the virtualized storage area and the real storage area. Then, an encrypt start signal of the storage area 510 is sent to the storage system 500 (S50).

If the storage system 500 receives the encrypt start signal, the encrypted state 5001 of the entry in which the storage area identifier 5000 of the encrypted state management table 506 is the storage area 510 is set to "ON" (S51). Then, the encrypt process of the storage area 510 is performed (S52). If the encrypt process of the storage area 510 is completed, the storage system 500 sends an encrypt completion signal to the management terminal 300 (S53).

If the management terminal 300 receives the encrypt completion signal, the overall move control module 304 sends a decrypt start signal of the virtualized storage area 410 to the storage system 400, based on the encrypted state management tables 406 and 506 acquired at S49 (S54).

If the storage system 400 receives the decrypt start signal, the encrypted state 4004 of the entry in which the storage area identifier 4000 of the encrypted state management table 406 is the storage area 410 is set to "OFF" (S55). Then, the decrypt process of the virtualized storage area 410 is performed (S56). If the decrypt start signal of the virtualized storage area 410 is completed, the storage system 400 sends a decrypt completion signal to the management terminal 300 (S57), and the process is ended.

The encrypt process at S52 and the decrypt process at S56 are similarly performed according to the encrypt process flow and the decrypt process flow as shown in FIGS. 7 and 8.

Also, the process for the read request received by the storage system 500 while the process from S51 to S52 is performed is the same as the read process during move in the move destination storage system as shown in FIG. 9. Similarly, the process for the write request received by the storage system 500 is the same as the write process during move in the move destination storage system as shown in FIG. 10.

Also, the process for the read request received by the storage system 400 while the process from S55 to S57 is performed is the same as the read request process during move in the move source storage system as shown in FIG. 11. Similarly, the process for the write request received by the storage system 400 is the same as the write process during move in the move source storage system as shown in FIG. 11.

Embodiment 2

An embodiment 2 will be described below. This embodiment is the second embodiment of the invention, and a modification of the embodiment 1. Although this embodiment is basically same to the embodiment 1, the different points from the embodiment 1 are given below. The configuration of a computer system according to this embodiment is the same as shown in FIG. 1.

In the embodiment 1, all the blocks of the storage area of move object in the encryption-decryption process are encrypted by the move destination encryption-decryption module, and then decrypted by the move source encryption-decryption module. In the embodiment 2, all the blocks of the storage area of move object are divided into a plurality of blocks, and the management terminal 300 makes an inquiry about an encrypt progress situation in the move destination encryption-decryption module to the move destination storage system at every fixed interval, whereby the decrypt process in the move source encryption-decryption module for up to the block for which the encrypt process in the move destination encryption-decryption module is completed is performed in parallel with the encrypt process in the move destination encryption-decryption module of data stored in the unencrypted block.

FIG. 14 is a flowchart for explaining a move process for converting the data of the storage area 510 encrypted by the encryption-decryption module 505 of the storage system 500 to the data encrypted by the encryption-decryption module 405 of the storage system 400 and changing the encryption-decryption process performed by the encryption-decryption module 505 to be performed by the encryption-decryption module 405 in the embodiment 2.

Before starting the process for changing as shown in FIG. 14, like the process for changing as shown in FIG. 6, the administrator (user who can use the management terminal 300) designates in advance the storage area of move object, the storage system having the storage area concerned, the move destination encryption-decryption module, and the storage system having the encryption-decryption module concerned.

First of all, the management terminal 300 acquires the encrypted state management tables 406 and 506 for the storage systems 400 and 500 (S58), and sends an encrypt start signal of the virtualized storage area 410 to the storage system 400 (S59).

If the storage system 400 receives the encrypt start signal, the encrypted state 4004 of the entry in which the storage area identifier 4000 of the encrypted state management table 406 is the virtualized storage area 410 is set to "ON" (S60). Then, the encrypt process of the virtualized storage area 410 is performed (S61).

The management terminal 300 refers to the processed pointer at every fixed interval (S62) while the storage system 400 performs the encrypt process of the virtualized storage area 510, and confirms a progress situation of the encrypt process. Further, after confirming the progress situation of the encrypt process, the management terminal 300 sends a decrypt process for up to the block for which the encrypt process is completed to the storage system 500 (S63). And it is determined whether or not the encrypt process for all the blocks in the storage area of move object is completed (S66). If the encrypt process for all the blocks is completed, the process is ended. If the encrypt process for all the blocks is not completed, the operation returns to S62.

If the storage system 500 receives the decrypt start signal, the encrypted state of the entry in which the storage area identifier of the encrypted state management table 506 is the storage area 510 is set to "OFF" (S64), and the decrypt process is performed (S65).

The invention is not limited to the above embodiments, but the following variation may be made. The encryption-decryption modules 405 and 505 are not only implemented by software, but also by hardware using a dedicated LSI or the like. Also, the overall move control module 304 is not only provided for the management terminal 300, but also may be provided for the storage systems 400, 500 or the host computer 200. And the encryption-decryption module may be provided for any other system than the storage system instead of the encryption-decryption module for the storage system.

While the present invention has been described above in connection with the embodiments, another embodiment 1 of the invention is the computer system according to the invention, further comprising a management terminal for managing the plurality of storage systems, in which the management terminal makes an instruction of encrypt start to the second storage system and makes an instruction of decrypt start to the first storage system by receiving an encrypt completion signal from the second storage system.

Also, another embodiment 2 of the invention is the computer system according to the invention, further comprising a management terminal for managing the plurality of storage systems, in which the management terminal acquires the encrypted state information of the first storage system and the second storage system when making an instruction of encrypt start to the second storage system.

And another embodiment 3 of the invention is the computer system according to the invention, further comprising a management terminal for managing the plurality of storage systems, in which the management terminal makes an inquiry about an encrypt progress situation to the second storage system at every fixed period, and makes an instruction of decrypt start for the encrypted block to the first storage system.

Further, another embodiment 4 of the invention is the computer system according to the invention, wherein the second storage system decrypts or does not decrypt the read data depending on whether or not the data is in the encrypted block for the second storage system, upon a read request for the storage area of the first storage system from the host computer.

Also, another embodiment 5 of the invention is the computer system according to the invention, wherein the second storage system encrypts or does not encrypt the write data depending on whether or not the data is in the encrypted block for the second storage system, upon a write request for the storage area of the first storage system from the host computer.

And another embodiment 6 of the invention is a management terminal for controlling two storage systems having one or more storage areas for storing the data that a host computer reads or writes, in which two storage systems are a first storage system and a second storage system that store the encrypted or decrypted data in the storage areas, and one storage system provides a storage area that the other storage system connected has as the area for accepting access from the host computer as the storage area of its own, wherein the management terminal makes an instruction of encrypt start to the second storage system to control the second storage system to encrypt successively the data decrypted in the first storage system, for each block, and control the first storage system to further encrypt and store successively the data encrypted in the second storage system in the storage area of the first storage system, and the management terminal receives an encrypt completion signal from the second storage system, and controls the first storage system to decrypt successively the data further encrypted in the first storage system, and store the data encrypted in the second storage system in the storage area of the first storage system.

Further, another embodiment 7 of the invention is the management terminal according to another embodiment 6 of the invention, which makes an inquiry about an encrypt progress situation to the second storage system at every fixed period, and makes an instruction of decrypt start for the encrypted block to the first storage system.

Also, another embodiment 8 of the invention is a storage system having one or more storage areas for storing the data that a host computer reads or writes, and controlling another storage system, in which the storage system and another storage system compose two storage systems that are a first storage system and a second storage system that store the encrypted data in the storage areas, and one of two storage systems provides a storage area that another storage system connected has as the area for accepting access from the host computer as the storage area of its own, wherein the storage system makes an instruction of encrypt start to the second storage system or makes the encrypt start of the second storage system to control the second storage system to encrypt successively the data decrypted in the first storage system, for each block, and control the first storage system to further encrypt and store successively the data encrypted in the second storage system in the storage area of the first storage system, and the storage system receives an encrypt completion signal from the second storage system, or makes the encrypt completion of the second storage system, and controls the first storage system to decrypt successively the data further encrypted in the first storage system, and store the data encrypted in the second storage system in the storage area of the first storage system.

And another embodiment 9 of the invention is an encryption management method for use in a computer system having one or more host computers, and a plurality of storage systems each having one or more storage areas for storing the data that the host computer reads or writes, wherein two of the plurality of storage systems are a first storage system and a second storage system that store the encrypted data in respective storage areas, and one storage system provides a storage area that the other storage system connected has as the area for accepting access from the host computer as the storage area of its own, in performing a process for changing in which the data encrypted and stored in the storage area of the first storage system by the first storage system is encrypted and stored in the storage area of the first storage system by the second storage system, the data to be moved is divided into one or more blocks, for each block, the second storage system encrypts successively the data decrypted by the first storage system, and the first storage system further encrypts and stores successively the data encrypted by the second storage system in the storage area of the first storage system, and after all the data in one block is further encrypted and stored in the storage area of the first storage system, the first storage system successively decrypts all the data in one block further encrypted and stores the data encrypted by the second storage system in the storage area of the first storage system.

Further, another embodiment 10 of the invention is the encryption management method according to another embodiment 9 of the invention, wherein the computer system further comprises a management terminal for managing the plurality of storage systems, in which the management terminal makes an instruction of encrypt start to the second storage system and makes an instruction of decrypt start to the first storage system by receiving an encrypt completion signal from the second storage system.

Also, another embodiment 11 of the invention is the encryption management method according to another embodiment 9 of the invention, wherein the computer system further comprises a management terminal for managing the plurality of storage systems, in which the management terminal acquires the encrypted state information of the first storage system and the second storage system when making an instruction of encrypt start to the second storage system.

And another embodiment 12 of the invention is the encryption management method according to another embodiment 9 of the invention, wherein the computer system further comprises a management terminal for managing the plurality of storage systems, in which the management terminal makes an inquiry about an encrypt progress situation to the second storage system at every fixed period, and makes an instruction of decrypt start for the encrypted block to the first storage system.

Further, another embodiment 13 of the invention is the encryption management method according to another embodiment 9 of the invention, wherein the second storage system decrypts or does not decrypt the read data depending on whether or not data is in the encrypted block for the second storage system, upon a read request for the storage area of the first storage system from the host computer.

Also, another embodiment 14 of the invention is the encryption management method according to another embodiment 9 of the invention, wherein the second storage system encrypts or does not encrypt the write data depending on whether or not data is in the encrypted block for the second storage system, upon a write request for the storage area of the first storage system from the host computer.

What is claimed is:
1. A computer system comprising:
at least one host computer;
a plurality of storage systems; and
a management terminal for managing the plurality of storage systems,
wherein each of the plurality of storage systems have at least one storage area for storing data that the at least one host computer reads or writes,
wherein the plurality of storage systems includes a first storage system and a second storage system that store encrypted data in respective storage areas,
wherein the first storage system comprises a first storage area, and is coupled to the second storage system,
wherein the second storage system comprises a second storage area,
wherein the second storage area is a virtualized storage area for accepting access from the host computer as the storage area of the second storage system,
wherein when a data encryption base changes from the first storage system to the second storage system, data to be moved is divided into at least one block,
wherein for each at least one block, the second storage system encrypts successively data decrypted by the first storage system,
wherein the first storage system doubly-encrypts and stores successively the data encrypted by the second storage system in the first storage area of the first storage system,
wherein after all the data in the at least one block is doubly-encrypted and stored in the first storage area of the first storage system, the first storage system successively decrypts all the data in the least one block doubly-en- crypted and stores the data encrypted by the second storage system in the first storage area of the first storage system, wherein the management terminal acquires encrypted state information of the first storage system and the second storage system, instructs the second storage system to start encryption, and instructs the first storage system to stop the encryption, and to start decryption, when the management terminal receives a signal from the second storage system indicating that the encryption is complete, and wherein when a write request for the first storage area of the first storage system is received from the host computer, the second storage system encrypts or does not encrypt the write data depending on whether or not the write request is for data in an encrypted block for the second storage system.

* * * * *